United States Patent
Polehn et al.

(10) Patent No.: US 9,638,792 B2
(45) Date of Patent: May 2, 2017

(54) METHOD AND APPARATUS FOR DETECTING OBSTACLES IN PROPAGATION PATH OF A WIRELESS COMMUNICATION SIGNAL

(71) Applicant: Verizon Patent and Licensing Inc., Arlington, VA (US)

(72) Inventors: Donna L. Polehn, Kirkland, WA (US); Fred Weisbrod, Renton, WA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 120 days.

(21) Appl. No.: 14/327,352

(22) Filed: Jul. 9, 2014

(65) Prior Publication Data

US 2016/0013822 A1    Jan. 14, 2016

(51) Int. Cl.
*H04W 24/00*    (2009.01)
*G01S 13/04*    (2006.01)
*G01S 13/00*    (2006.01)

(52) U.S. Cl.
CPC ............. *G01S 13/04* (2013.01); *G01S 13/003* (2013.01)

(58) Field of Classification Search
CPC ...... H04W 24/06; H04W 24/08; H04W 24/10
USPC ........................................................ 455/424
See application file for complete search history.

(56) References Cited

U.S. PATENT DOCUMENTS

| | | | | |
|---|---|---|---|---|
| 5,930,707 A * | 7/1999 | Vambaris | ............... | H04W 24/00 379/29.01 |
| 6,308,065 B1 * | 10/2001 | Molinari | ............... | H04W 24/00 455/423 |
| 6,925,301 B2 * | 8/2005 | Hill | ........... | H04B 17/16 455/115.1 |
| 7,729,692 B2 * | 6/2010 | Oka | ........ | H04B 17/23 324/537 |
| 8,279,077 B1 * | 10/2012 | Liff | ..... | G08B 13/2402 340/539.23 |
| 8,824,588 B2 * | 9/2014 | Emmanuel | ............. | H04B 17/10 375/224 |
| 8,934,937 B1 * | 1/2015 | Zehr | ........ | H01Q 1/243 455/117 |
| 2003/0064761 A1 * | 4/2003 | Nevermann | ......... | H04B 1/3838 455/572 |
| 2004/0204026 A1 * | 10/2004 | Steer | ......... | H04W 4/04 455/550.1 |
| 2005/0032494 A1 * | 2/2005 | Swant | ................. | H04B 17/309 455/226.1 |
| 2006/0238337 A1 * | 10/2006 | Minassian | ............. | G08B 25/10 340/539.23 |
| 2010/0331049 A1 * | 12/2010 | Diaz Mateos | .... | H04W 52/0206 455/562.1 |

(Continued)

*Primary Examiner* — Wen Huang

(57) ABSTRACT

An approach for implementing a mechanism to detect obstacles in propagation path of a wireless communication signal and dynamically control one or more functions in a communication system of the signal. The approach includes receiving a sensed signal at a sensing antenna, wherein the sensing antenna is associated with a transmitting antenna. The approach also includes determining that the sensed signal is a disrupted signal element of a transmitted signal originating from the transmitting antenna. Further, the approach includes initiating a cessation of the transmitted signal, an attenuation of the transmitted signal, a presentation of an alert notification, or combination thereof based on the disrupted signal element signal.

20 Claims, 11 Drawing Sheets

(56) References Cited

U.S. PATENT DOCUMENTS

2012/0142291 A1* 6/2012 Rath .................... H04B 7/0602
                                                    455/127.1
2013/0324111 A1* 12/2013 Tontinuttanon ....... H04L 41/147
                                                    455/424

* cited by examiner

FIG. 7

Service Provider X - Transmission Signal Report

| | Trans. hub | Signal | Target | Alerts |
|---|---|---|---|---|
| 1 | Plaza Building | Link | Golden Tower | Obstacle, five minutes interruption |
| 2 | Central Tower | Cellular | City Center Area | Human, cease transmission |
| 3 | Baseball Field | Uplink | Satellite X | Human, two minutes interruption |
| 4 | Golden Tower | Link | Johnson Building | No events or alerts |

METHOD AND APPARATUS FOR DETECTING OBSTACLES IN PROPAGATION PATH OF A WIRELESS COMMUNICATION SIGNAL

BACKGROUND INFORMATION

With a rapid growth in use of various communication services by various users and their devices, communication service providers are constantly challenged with expanding or updating their systems in order to be able meet user demand. In some communication system architectures, communication links among system components may be effectuated via a combination of wireline or wireless signaling schemes. Additionally, with an expanding communication system and service areas, the service providers may utilize various options for implementing more reliable, efficient, and cost effective solutions in the wireless portions. For example, a communication system may employ a plurality of wireless signaling schemes (e.g., different frequencies, power levels, bandwidth, etc.) in different segments of the wireless portion of the system so to provide the service at a certain quality of service (QoS). However, in some scenarios, some elements (e.g., antennas, base stations, microcells, etc.) of a wireless communication system may need to be installed at locations that are near the users or accessible by the public. In such scenarios, public safety and regulatory requirements are to be considered when designing or operating the system.

Based on the foregoing, there is a need for a mechanism to detect obstacles near a wireless communication system and dynamically control one or more functions in the system.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 7 illustrates a report including event and alert information associated with one or more points in a communication system, according to one embodiment;

DESCRIPTION OF THE PREFERRED EMBODIMENT

An apparatus, method and software for detecting obstacles near a wireless communication signal source and dynamically controlling one or more parameters associated with the signal are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
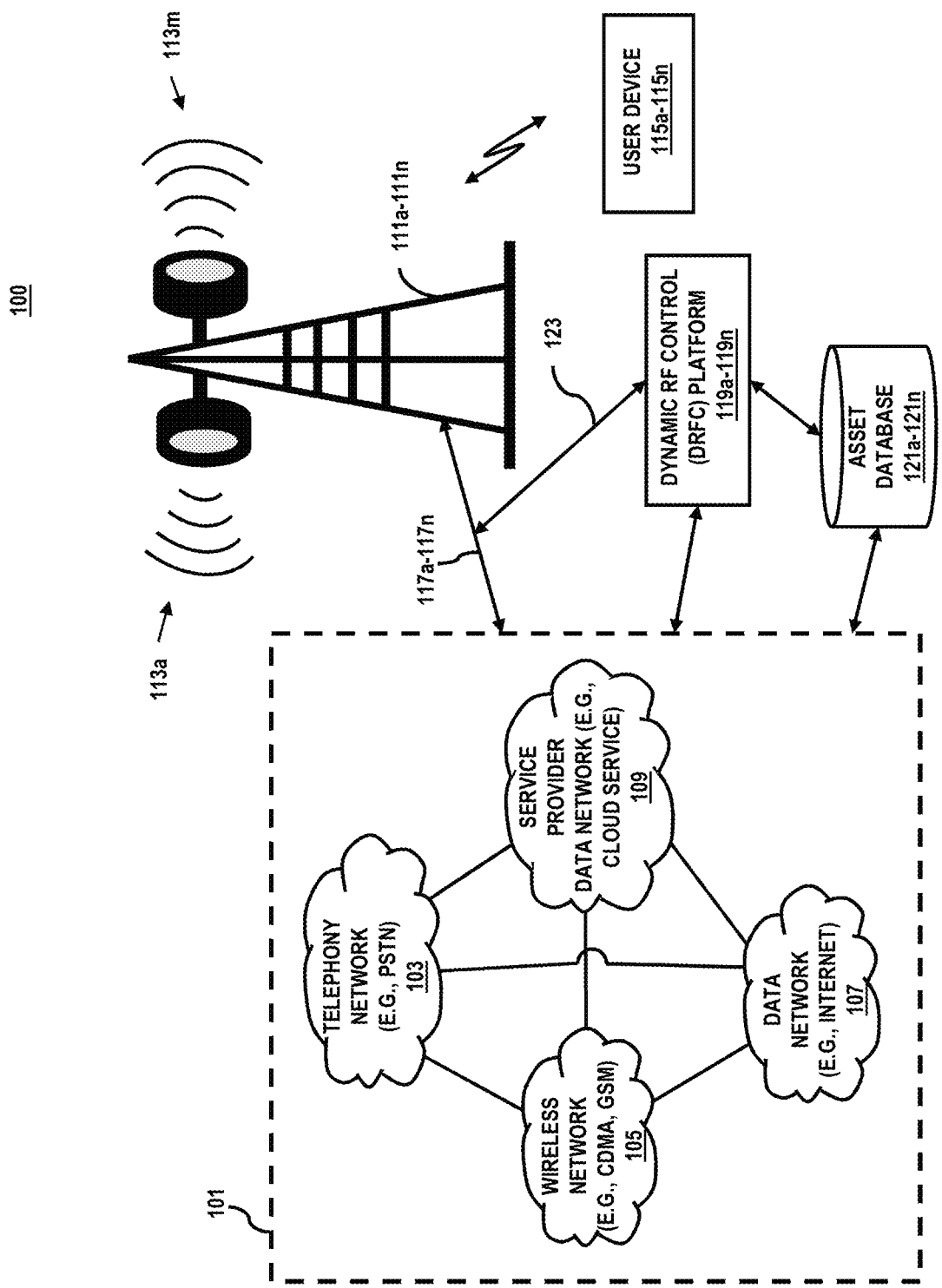
FIG. 1 is a diagram of a system capable of implementing a mechanism to detect obstacles in propagation path of a wireless communication signal, according to one embodiment.

FIG. 1 is a diagram of a system for implementing a mechanism for detecting obstacles near a wireless communication signal (e.g., radio frequency (RF)) source and dynamically controlling one or more parameters associated with the signal. In general, as communication service providers strive to provide better service or broader service areas, they may encounter challenging environments or safety and regulatory requirements that need to be addressed, for example, during the design or operation of various components of a communication system. One area of interest in a communication system is the architecture of the wireless portion in the system, wherein different components of the wireless portion may be installed at different physical locations. For example, for a given wireless service area, a wireless system may include a plurality of antennas, base-stations, controllers, or the like, which may be installed close to the target service area. Also, it is possible that some of the components can be installed at or operated from physical locations that pose little or no challenge for the installation or a safe operation. For example, a base-station, its controller, and an antenna tower with a plurality of antennas (e.g., for cellular, microwave, worldwide interoperability for microwave access (WiMAX), etc.) on it can be installed at an open field that is near an intended wireless service area (e.g., a residential area.) However, not all components can be installed and operated from such remote locations. In some scenarios, in order to provide service to certain service areas or to effectuate reliable wireless links among wireless components, some of the wireless components may need to be installed at locations that are near or that are accessible by people. For example, in providing cellular service to an area without an antenna tower, a cellular antenna may be installed atop a building in the area, wherein the building may be for residential or commercial use. Similarly, in order to provide a wireless link between two microwave antennas, the antennas may be installed and operated from atop two buildings, or one atop a building and another on an antenna tower, so that the wireless link can be operated properly and efficiently. However, at some of the locations, people may intentionally or inadvertently become too close to the wireless system components that may have an adverse impact on the people or the system.

Therefore, there is a need for mitigating any potential issues by detecting obstacles or people near a wireless communication signal source and dynamically controlling one or more parameters associated with the signal.

To address these issues, system 100 of FIG. 1 provides the capability for implementing a dynamic RF controller (DRFC) platform for detecting obstacles or people near a wireless communication signal source and dynamically controlling one or more parameters associated with the signal. As previously discussed, in some situations, various components of a wireless communication system may be placed at locations where people may become in close proximity, which may need to be mitigated for the benefit of the people or the system. Various solutions to detect a person becoming too close to a wireless signal source may be unable to timely detect the person or initiate one or more actions for mitigating potential issues that may impact the person or the system. However, the DRFC of the system 100 can utilize various system components, programs, algorithms, or the like to detect an obstacle, present local and remote alert notifications, and initiate one or more processes to control various characteristics associated with the signal or the signal source. In one embodiment, the DRFC platform may interface with a transmitting antenna as well as a sensing antenna. In one scenario, the sensing antenna may sense/receive a signal that is associated with a signal that is transmitted via the transmitting antenna. In one embodiment, the sensing antenna and the transmit antenna may be elements of a same RF device, for example a duplex antenna, wherein a signal may be transmitted as well as received via the same RF device. In one embodiment, a sensing antenna may receive a disrupted signal element of a transmit signal that is being or was just transmitted via the transmitting antenna. In one scenario, the disrupted signal element may be a reflection of one or more portions of the transmitted signal, wherein all or a portion of the transmitted signal may reflect off of an obstructing object (e.g., a person) that is near or in front of a transmit antenna propagation path, and wherein the transmitting and sensing antennas are located at a substantially opposing location (e.g., facing the same direction) with reference to the object. In one scenario, a disrupted signal element may be a component of a scattered signal. In one embodiment, the disrupted signal element may be an attenuated or a diffracted signal element of the originally transmitted signal. For example, the sensing antenna may be located at an opposing location with reference to the transmitting antenna, wherein the obstructing object is located substantially between the transmitting and sensing antennas. In various embodiments, the DRFC platform may process the disrupted signal element to determine one or more characteristics of the disrupted signal element and issue one or more commands to one or more elements, modules, or components associated with a transmission hub. For example, a command may be to attenuate the signal, suspend, stop, start, or re-start transmission of the signal. In one embodiment, the DRFC platform may initiate a local process to attenuate, step, or a re-start of a transmission of a signal. In one embodiment, the DRFC platform may generate or cause to generate one or more notifications, alerts, alarms, messages, or the like, which may be presented via one or more elements associated with a transmission hub. For example, a visual or an audio alert may be presented at or near a transmission antenna. In one embodiment, a report of information about an alert notification at a transmission hub may be presented to an entity that is associated with a transmission signal/hub, for example, a service provider service center.

For the purpose of illustration, the system 100 may include a network system 101, which may include one or more networks, including a telephony network 103, a wireless network 105, a data network 107, a service provider data network 109, etc. By way of example, the networks 103, 105, 107, and 109 may be any suitable wireline and/or wireless network, which may be managed by one or more service providers. In one example, the networks 103, 105, 107, and 109 may be one or more elements in the network system 101, which may include various components and elements for providing a range of communication and network services. For example, telephony network 103 may include a circuit-switched network, such as the public switched telephone network (PSTN), an integrated services digital network (ISDN), a private branch exchange (PBX), or other like network. Wireless network 105 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, data network 107 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, networks 103, 105, 107, and 109 may be completely or partially contained within one another, or may embody one or more of the aforementioned infrastructures. For instance, the service provider network 109 may embody circuit-switched and/or packet-switched networks that include facilities to provide for transport of circuit-switched and/or packet-based communications. It is further contemplated that networks 103, 105, 107, and 109 may include components and facilities to provide for signaling and/or bearer communications between the various components or facilities of system 100. In this manner, networks 103, 105, 107, and 109 may embody or include portions of a signaling system 7 (SS7) network, or other suitable infrastructure to support control and signaling functions.

Further, one or more entities of the network system 101 may utilize one or more transmission hubs 111a-111n (transmission hub 111), which may include or have access to one or more transmission elements for wireline or wireless transmission of communication signals. In one example, a transmission hub 111 may use one or more antennas 113a-113m to transmit a plurality of wireless signals to user devices 115a-115n (user device 115) or other transmission hubs 111. For example, the wireless network 105 may utilize a transmission hub 111 to transmit, via the antennas 113, cellular communication signals to the user devices 115. In another example, the service provider 109 may utilize a transmission hub 111 and an antenna 113a to create a wireless link between transmission hubs 111a and 111b, wherein the wireless link can provide for a transfer of data from the hub 111a to the hub 111b. In various embodiments, one or more elements of the network system 101 may be remote to or co-located with a transmission hub 111, wherein one or more transmission lines 117a-117n (e.g., coaxial cable) may be utilized to provide the communication signals from a network element (e.g., a transmit/receive base station) to a transmission hub 111.

Additionally, the system 100 may include one or more DRFC platforms 119a-119n (DRFC platform 119) that can interface with any of the elements in the network system 101 and the transmission hubs 111. In one example, a DRFC platform 119 may include or have access to one or more asset databases 121a-121n, which may include information about one or more assets (e.g., transmission hubs, antennas, base stations, control centers, etc.) that may be associated with one or more elements of the network system 101. In one embodiment, the DRFC platform may utilize one or more elements/components to determine an obstacle in transmission of a wireless signal via an antenna 113. For example, the antenna 113, a different antenna, a video camera, a motion detector, or the like sensor may indicate that a person or an object is in close proximity of a transmitting or receiving antenna. In one embodiment, a DRFC platform may have access to a transmission line 117 via a control/sensing interface line 123. In one scenario, a DRFC platform may monitor signals in a transmission line 117, where the signals may be communicated between to an element in the network system 101 and a transmission hub 111. In one embodiment, a DRFC platform may monitor a signal in a transmission line 117, determine one or more information items from an analysis of the signal, analyze the information items, and provide one or more control signals to effectuate a modification to the signal. For example, a control signal may lower/increase a transmission power level, stop or suspend transmission, etc. In one embodiment, in addition to or instead of monitoring a signal in a transmission line 117, the DRFC platform may receive a signal from one or more elements/components (e.g., an antenna, a base station, etc.) in the system 100.

Figure 2:
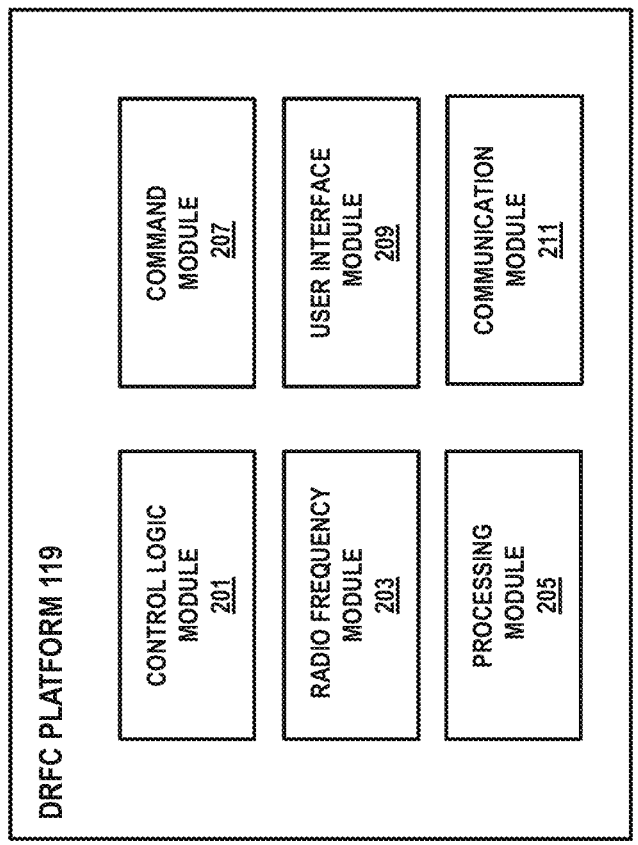
FIG. 2 is a diagram of the components of a dynamic radio frequency control platform, according to one embodiment.

FIG. 2 is a diagram of the components of a DRFC platform, according to an embodiment. By way of example, the DRFC platform 119 includes one or more modules for transmitting, receiving, processing, or analyzing one or more communication signals. It is contemplated that the functions of the modules may be combined in one or more modules or components or performed by other modules or components of equivalent functionality. In one embodiment, the DRFC platform 119 includes a control logic module 201, a radio frequency (RF) module 203, a processing module 205, a command module 207, a user interface (UI) module 209, and a communication module 211.

The control logic module 201 oversees tasks that it may perform or that other modules may perform. For example, although other modules may perform the actual task, the control logic module may determine when and how those tasks are to be performed or otherwise direct the other modules to perform the tasks.

In one embodiment, the RF module 203 may receive from one or more signals from one or more elements of the system 100 or may monitor signals that are communicated between the elements (e.g., a base station) and one or more transmission hubs 111. Further, the RF module may perform one or more signal analysis processes to determine various information items associated with a signal. For example, the RF module may demodulate a signal and determine a signal profile, which may include information about a signal frequency, phase, power level, signal to noise ratio (S/N), bandwidth, energy level, or the like. In one embodiment, the RF module 203 may utilize one or more algorithms for transforming the signals to one or more digital signals, digital arrays, digital patterns, or the like, which may be shared with the processing module 205. In one embodiment, the RF module 203 may include various circuitry or components (e.g., analog comparators) for comparing two or more analog to determine one or more differences associated with one or more information items or characteristics in the respective signal profiles.

The processing module 205, may receive one or more digitized signal profiles from the RF module 203 and then use one or more processes or algorithms to process the signal profiles. For example, a processed signal may include information may include information about an entity (e.g., a service provider) in the system 100 that is associated with the signal. Further, processing module 205 may perform a comparison process to compare a plurality of one or more processed signals to determine one or more differences in the characteristics associated with the signals. For example, the processing module 205 may compare phase, amplitude, (S/N), power level, and other characteristics of the signals.

In one embodiment, the command module 207 may receive one or more information items from the processing module 205 or information from an entity (e.g., a service provider) in the system 100, wherein the information may be used to determine and issue one or more commands to one or more elements, modules, components or the like associated with a transmission hub 111. For example, a command may be to suspend, stop, start, or re-start transmission or a signal or to change one or more parameters associated with a transmission of the signal. In one scenario, the command module may receive information from a service provider associated with a transmission signal, where the information may be used to determine the command.

In one embodiment, the UI module 209 may provide one or more mechanisms for presenting one or more notifications, alerts, alarms, messages, or the like, which may be presented via one or more elements associated with a transmission hub 111. For example, a visual or an audio alert may be presented at or near an antenna 113. In one embodiment, information about a notification and an associated transmission hub may be presented as a report to an entity that is associated with the transmission hub. In one embodiment, the UI module 209 may utilize information from the command module 207 or an entity in the system 100 for resetting a notification alert that is active at a transmission hub 111. For example, the UI module may stop a visual or audio alert that is active at a transmission hub.

In one embodiment, the communication module 211 may be utilized to communicate with various components of the system 100 or with the modules of the DRFC platform 119. In one embodiment, the communication module 211 may utilize one or more communication channels to communicate the information available from one or modules of the DRFC platform to one or more entities in the system 100. For example, a report about an active notification alert may be communicated to a service provider in the system 100. By way of example, the communication module 211 may execute various protocols and data sharing techniques for enabling collaborative execution of commands or sharing of information among the various elements of the system 100.

Figure 3A:
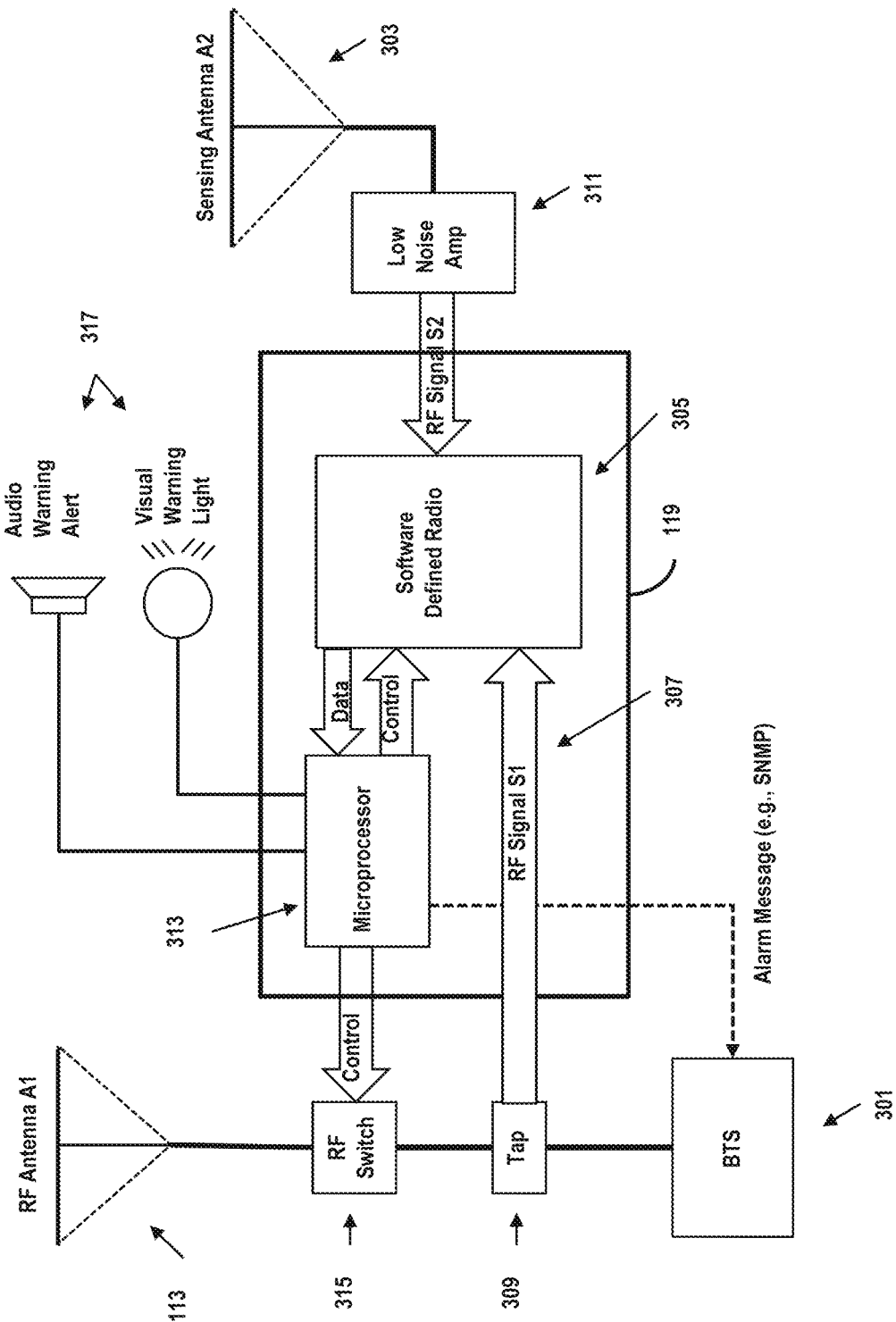
FIGS. 3A through 3C depict various configurations of a transmission hub for effectuating transmission, monitoring, and controlling of a transmission signal, according to various embodiments.
Figure 3B:
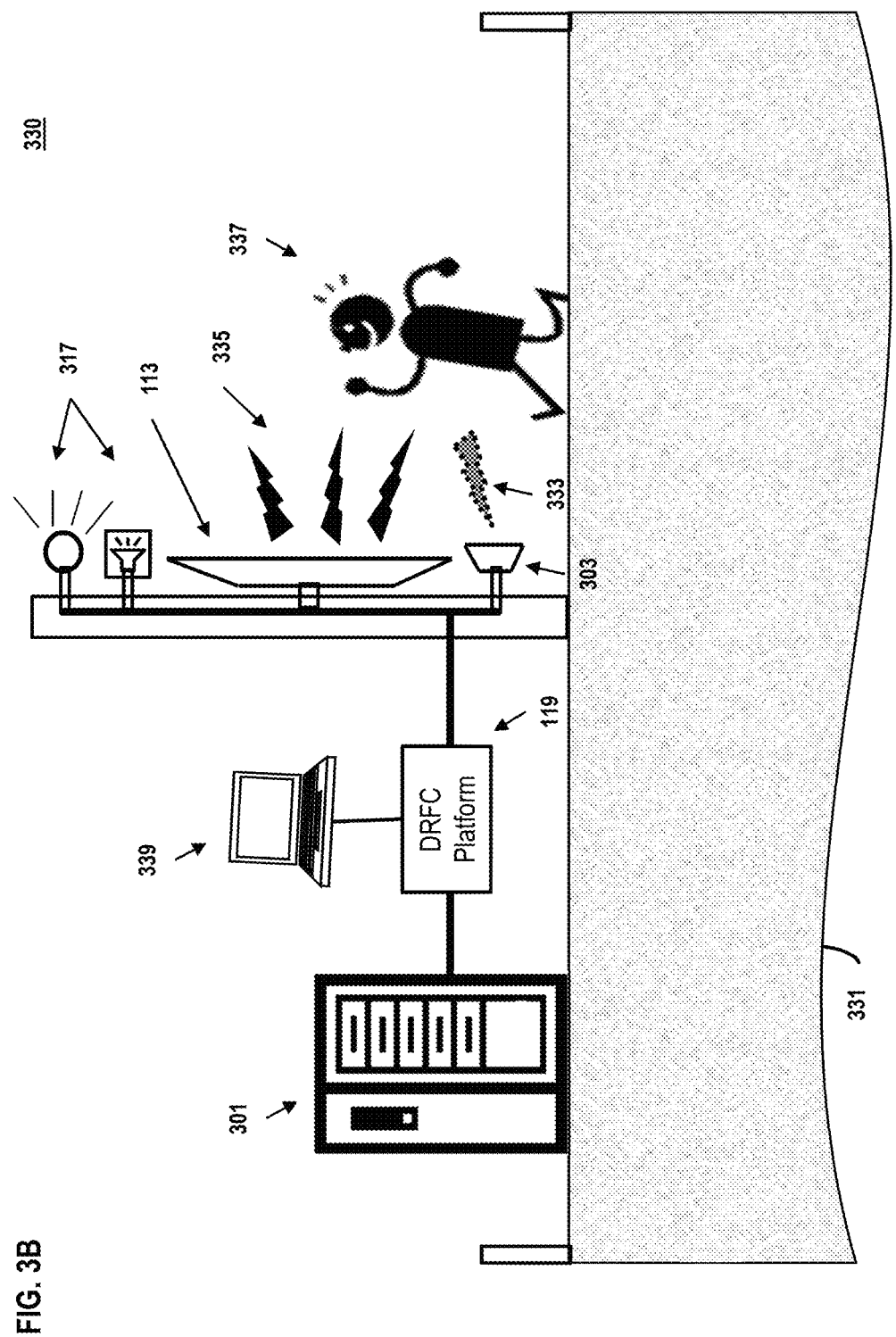
Figure 3C:
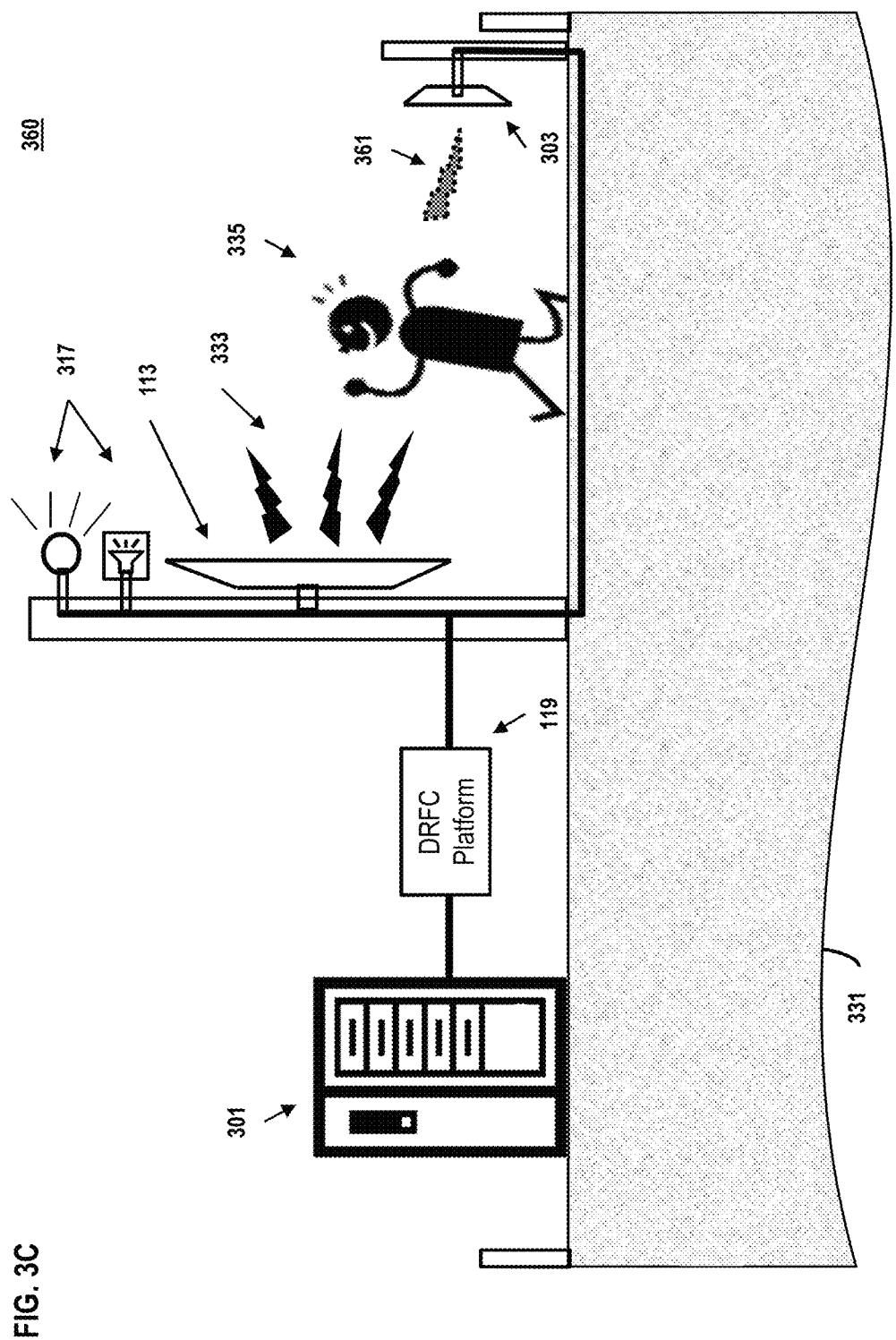

FIGS. 3A through 3C depict various configurations of a transmission hub where various elements are utilized for effectuating transmission, monitoring, and controlling of a transmission signal.

FIG. 3A includes configuration of transmission hub 300 includes a DRFC platform 119 that may interface with a transmit antenna 113, a transmitter device (e.g., a base station) (BTS) 301, a sensing antenna 303, and various components that may be used for interfacing, monitoring, or controlling functionalities at the transmission hub. In one scenario, the DRFC platform may interface with the BTS 301 for receiving information about a transmit signal that is to be transmitted via the transmit antenna 113. For example, the information from the BTS may include signal frequency, transmit energy, service provider (e.g., a cell phone service provider) associated with the transmission hub 300, anticipated signal gain/loss due to the RF system architecture of the transmission hub, or the like. In one embodiment, the information may be processed and stored at the DRFC platform for future use. In one embodiment, the DRFC platform may include and utilize a software defined radio (SDR) 305 element to monitor and access a transmit signal, RF signal 307, via an access tap 309. For example, the SDR 305 can demodulate, digital signal processing, etc. the RF signal 307. In one embodiment, the DRFC platform may interface with the sensing antenna 303 via one or more components 311 (e.g., a low noise amplifier) for receiving a sensed signal from the sensing antenna 303, wherein the sensed signal may include one or more signal portions of a signal transmitted via the transmit antenna 113. For example, the signal sensed via the sensing antenna 303 may be a reflection, attenuated, or otherwise modified version of the originally transmitted signal, wherein the modified version may be due to an obstacle located in a propagation path of the transmitted signal. In one embodiment, the DRFC platform may compare signal profiles associated with the transmitted signal and the sensed signal. For example, the RF signals may be compared via analog comparators, or the digitized signals may be compared via a digital signal processor and related algorithms. In one embodiment, the SDR 305 may share one or more information items with a processor 313, which may further process or utilize the information items. In one embodiment, if the signal comparison information indicate a match, then the processor 313 may communicate a control signal to an element 315 (e.g., an RF switch) to cause a cessation or an attenuation of the transmit signal via the transmit antenna. Further, the processor 315 may activate one or more alert notifications via one or more UI elements 317, e.g., audio, visual, etc. Additionally, the processor 313 may communicate a report of the alert back to the BTS 301 or to an entity (e.g., a service provider monitoring center) in the system 100.

FIG. 3B illustrates a diagram of transmission hub 330 which is configured and operated at a location 331 which may be accessed by various persons, for example, roof top of a commercial or residential building. As discussed with reference to FIG. 3A, the DRFC platform 119 may monitor communication and RF signals between the BTS 301 and the transmission antenna 113 for determining the information associated therewith. In various embodiments, configuration of the DRFC platform may be done via a user device 339 (e.g., laptop), where a service provider may configure the DRFC platform. In one scenario, the sensing antenna may receive a signal 333, which may be associated with transmit signal 335. For example, the transmission signal 335 may be reflect off an obstructing object or a person 337, which would result the sensed signal 333 received by the sensing antenna 303.

FIG. 3C illustrates a diagram of transmission hub 360 where the sensing antenna 303 is at a location away from the transmission antenna 113. In one embodiment, the sensing antenna 303 may be placed opposite the transmission antenna 113, wherein an object located in between the two antennas would cause a disruption for the sensing antenna to receive or monitor the transmission signal 333, which would result in the sensing antenna to sense a disrupted signal 361. For example, the signal 361 may be an attenuated version of the signal 333, wherein the person 335 may absorb some of the energy in the signal 333. In one embodiment, the configuration of the DRFC platform may be done via the BTS 301.

Figure 4:
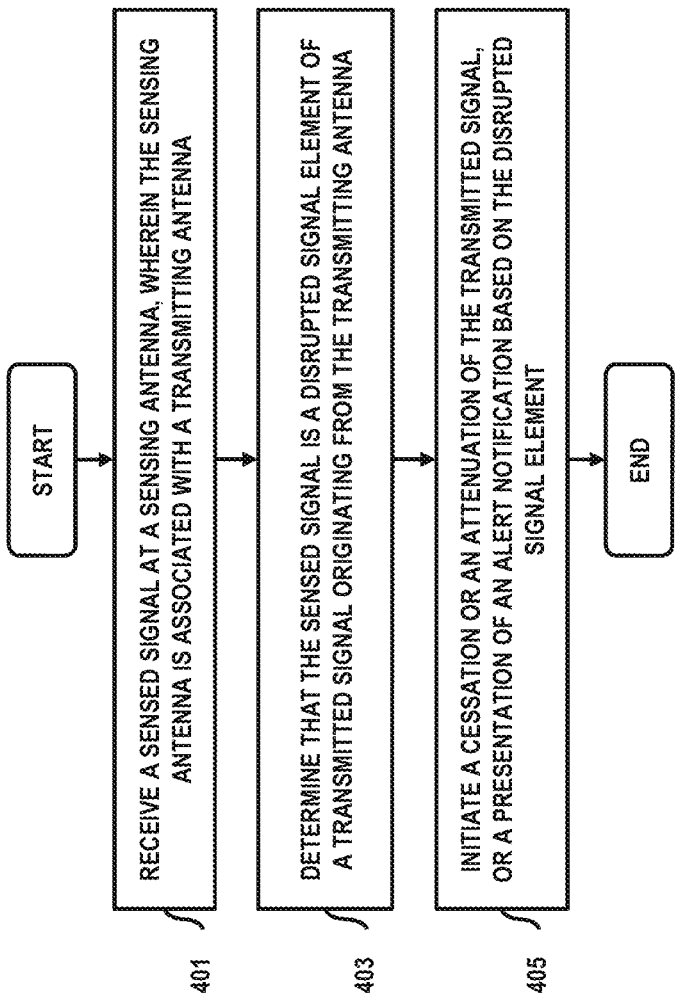
FIGS. 4 through 6 are flowcharts of processes to detect obstacles near a wireless signal source and dynamically control one or more parameters associated with the signal, according to various embodiments.
Figure 5:
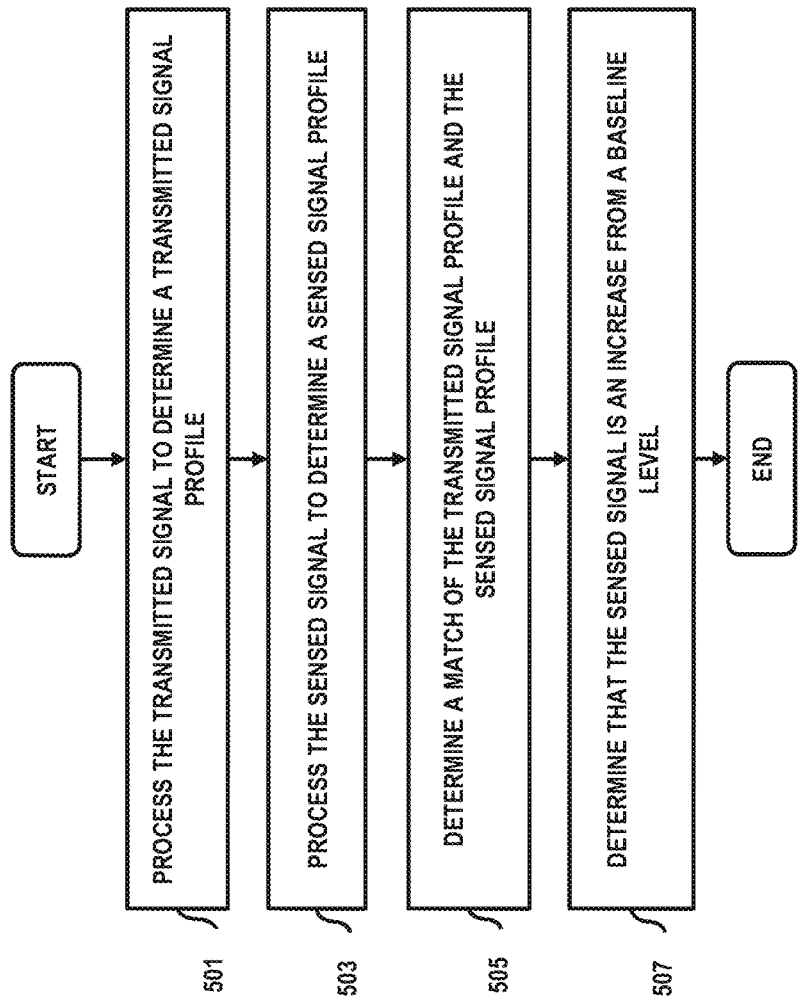
Figure 6:
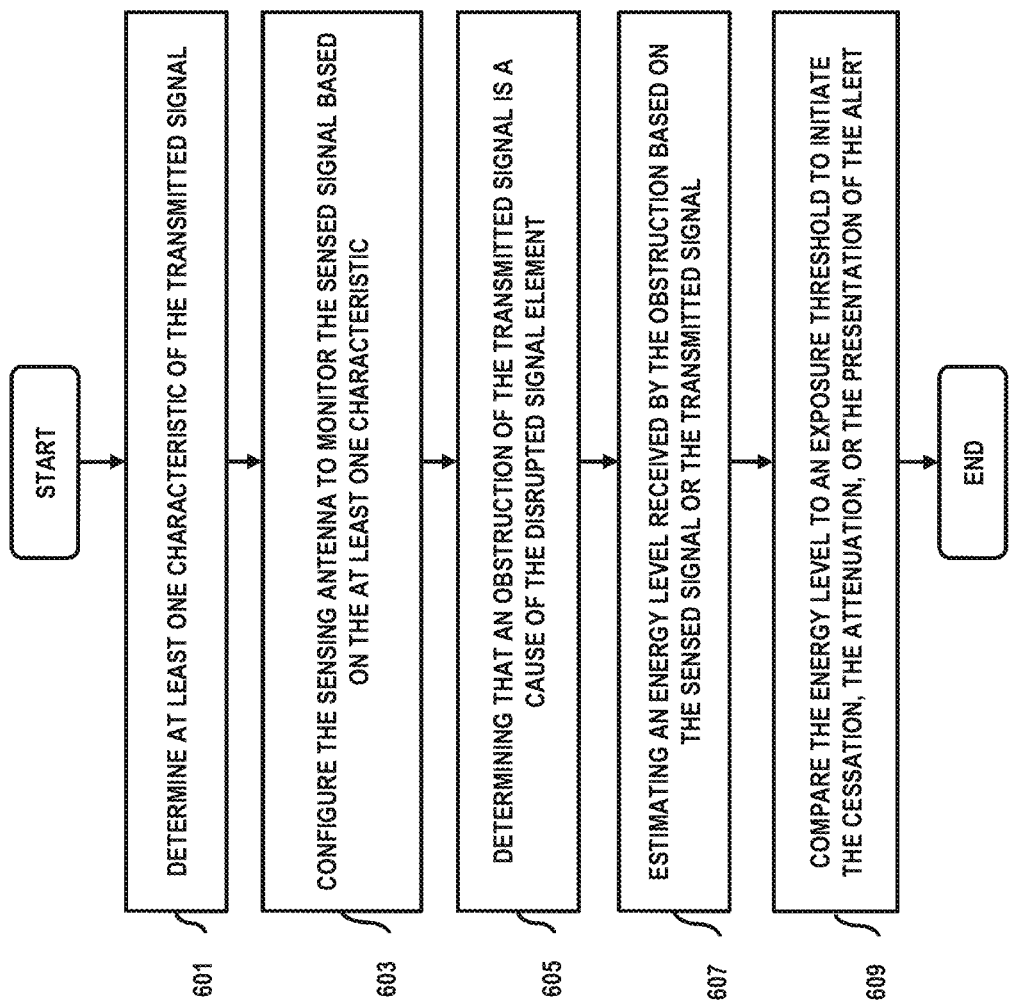

FIGS. 4 through 6 are flowcharts of processes for detecting obstacles near a wireless signal source and dynamically controlling one or more parameters associated with the signal, according to various embodiments. It is noted that the steps of processes 400, 500, and 600 may be performed in any suitable order as well as combined or separated in any suitable manner. Further, all or portions of the steps or the processes may be initiated or completed by any of the components of the system 100, for example, by the DRFC platform 119. However, for clarity in discussing the processes, the DRFC is referred to as completing various steps of said processes, which may be performed in any suitable order and where one or more of the steps may be optional.

Referring to FIG. 4, in step 401, the DRFC platform may receive a sensed signal at a sensing antenna, wherein the sensing antenna is associated with a transmitting antenna. In one embodiment, the DRFC platform may interface with a transmitting antenna as well as a sensing antenna. In one scenario, the sensing antenna may sense/receive a signal that is associated with a signal that is transmitted via the transmitting antenna. In one embodiment, the sensing antenna and the transmit antenna may be elements of a same RF device, for example a transceiving antenna, wherein a signal may be transmitted as well as received via the same RF device.

In step 403, the DRFC platform may determine that the sensed signal is a disrupted signal element of a transmitted signal originating from the transmitting antenna. In one embodiment, a sensing antenna may receive a disrupted signal element of a transmit signal that is being or was just transmitted via the transmitting antenna. In one scenario, the disrupted signal element may be a reflection of one or more portions of the transmitted signal, wherein all or a portion of the transmitted signal may reflect off of an obstructing object (e.g., a person) that is near or in front of a transmit antenna propagation path, and wherein the transmitting and sensing antennas are located at a substantially opposing location (e.g., facing the same direction) with reference to the object. In one scenario, a disrupted signal element may be a component of a scattered signal. In one embodiment, the disrupted signal element may be an attenuated or a diffracted signal element of the originally transmitted signal. For example, the sensing antenna may be located at an opposing location with reference to the transmitting antenna, wherein the obstructing object is located substantially between the transmitting and sensing antennas.

In step 405, the DRFC platform may initiate a cessation of the transmitted signal, an attenuation of the transmitted signal, a presentation of an alert notification, or combination thereof based on the disrupted signal element. In various embodiments, the DRFC platform may process the disrupted signal element to determine one or more characteristics of the disrupted signal element and issue one or more commands to one or more elements, modules, or components associated with a transmission hub 111. For example, a command may be to attenuate the signal, suspend, stop, start, or re-start transmission of the signal. In one embodiment, the DRFC platform may initiate a local process to effectuate a cessation, attenuation, or a re-starting of a transmission of a signal. In one embodiment, the DRFC platform may generate or cause to generate one or more notifications, alerts, alarms, messages, or the like, which may be presented via one or more elements associated with a transmission hub 111. For example, a visual or an audio alert may be presented at or near a transmission antenna 113. In one embodiment, a report of information about an alert notification at a transmission hub may be presented to an entity that is associated with a transmission signal/hub, for example, a service provider service center.

Referring to FIG. 5, in step 501, the DRFC platform may process the transmitted signal to determine a transmitted signal profile. In one embodiment, an access point between a signal source (e.g., a base station) and a transmit antenna may be used to monitor, receive, or access the transmit signal. In one embodiment, the DRFC platform may receive the transmit signal (e.g., a copy) directly from the source of the signal. In one embodiment, the processing of the transmit signal may be via an RF module for demodulating the transmit signal and determine a signal profile, which may include information about a signal frequency, phase, power level, signal to noise ratio (S/N), bandwidth, energy level, or the like. In one embodiment, the DRFC platform may utilize one or more algorithms for transforming the signal to one or more digital signals, digital arrays, digital patterns, or the like, which may be used to determine the signal profile. In one embodiment, the DRFC platform can utilize the signal profile of a transmit signal prior to its transmission as well as additional system information to calculate the signal profile of a signal that will be transmitted via a transmit antenna. For example, the DRFC platform can use information about the gains and losses that will impact a transmit signal before it is transmitted via a transmit antenna. In one embodiment, the DRFC platform may utilize a sensing antenna to receive a signal that is transmitted from a transmit antenna. For example, a sensing antenna may be a second antenna that is placed in close proximity of the transmit antenna.

In step 503, the DRFC platform may process the sensed signal to determine a sensed signal profile. In one embodiment, the processing may be via an RF module for demodulating a sensed signal and determine a signal profile, which may include information about the signal's frequency, phase, power level, signal to noise ratio (S/N), bandwidth, energy level, or the like. In one embodiment, the DRFC platform may utilize one or more algorithms for transforming the signal to one or more digital signals, digital arrays, digital patterns, or the like, which may be used to determine the signal profile. In various embodiments, the DRFC platform may utilize information about the RF characteristics of elements or components that are associated with an RF channel used in receiving the sensed signal. For example, the sensed signal may be received via a coaxial cable that includes connectors, filters, or the like. Further, the DRFC platform may utilize one or more algorithms to determine a substantially accurate representation of the sensed signal profile. For example, a substantially accurate energy level of a disrupted signal element.

In step 505, the DRFC platform may determine a match of the transmitted signal profile and the sensed signal profile, wherein the cessation of the transmitted signal, the attenuation of the transmitted signal, the presentation of the alert notification, or combination thereof is based on the match. In one embodiment, the DRFC platform may perform a comparison of the signal profiles associated with a transmitted signal and a sensed signal, wherein the profiles may be in analog or in digital format. For example, the RF signals may be compared via analog comparators, or the digitized signals may be compared via a digital signal processor and algorithm. In various embodiments, all or parts of the two signal profiles may be compared. For example, the energy level and frequency of the sensed signal may be compared to that of a transmitted signal. In one embodiment, if the comparison of the two signal profiles indicate a match, then the DRFC platform may cause or issue a command to cause a cessation or an attenuation of the transmit signal via the transmit antenna. Further, one or more alert notifications may be presented via UI elements near the transmit antenna; additionally, a report including the comparison result or actions initiated by the DRFC platform may be communicated to an entity in the system 100.

In step 507, the DRFC platform may determine that the sensed signal is an increase from a baseline level, wherein the cessation of the transmitted signal, the attenuation of the transmitted signal, the presentation of the alert notification, or combination thereof is based on the increase. In one embodiment, a DRFC platform may determine a baseline level for one or more parameters associated with a signal profile of a sensed signal corresponding to a transmitted signal. For example, a baseline may be determined for a sensed signal profile corresponding to a particular transmitted signal profile, wherein characteristics of each of signal profile may be used in determining a baseline for each parameter. For instance, baseline of an energy level of a sensed signal may be associated with the energy level (e.g., including a tolerance range level) of a transmitted signal. In one embodiment, the baseline level is a moving average of the sensed signal. In one embodiment, the baseline level may be determined based on environmental characteristics that are associated with the sensing and transmitting antennas. For example, presence of physical objects (e.g., electrical or mechanical equipment) and spatial information (e.g., walls, partial roof, a nearby fence, trees, etc.) near the transmitting or sensing antennas may be utilized when calculating or determining the baseline level.

Referring to FIG. 6, in step 601, the DRFC platform may determine at least one characteristic of the transmitted signal. In one embodiment, the DRFC platform may select one or more characteristics from a signal profile that is associated with a transmit signal that is to be monitored. For example, a power level, a frequency, S/N, or the like associated with a transmit signal may be selected from a signal profile that is associated with the transmit signal. In various scenarios, the selection of the one or more characteristics may be based on a signal type, signal use, the entity associated with the signal, environmental information associated with the signal, or the like. Further, the selection of the characteristics may be updated based on any current or future planned changes to the environment near the transmit signal. For example, the addition or removal of physical objects near the transmit signal antenna may cause an update to the characteristics. In one scenario, an update in the characteristics for monitoring may be based on possible changes to the sensing antenna, for example, change in the location or in the type of sensing antenna can cause a change in the characteristics to be monitored.

In step 603, the DRFC platform may configure the sensing antenna to monitor the sensed signal based on the at least one characteristic. In one scenario, a sensing antenna may be configured to monitor the characteristics that are associated with the transmit signal. For example, a sensing antenna may be configured to monitor a power level and frequency of a disrupted signal element that is associated with the transmit signal. In one embodiment, the at least one characteristic is determined from a coaxial tap of the transmitting antenna.

In step 605, the DRFC platform may determine that an obstruction of the transmitted signal is a cause of the disrupted signal element. In various scenarios, the DRFC platform may utilize one or more algorithms or processes to analyze a disrupted signal element and determine a potential cause of the disrupted signal element. For example, the analysis of a disrupted signal element may indicate that the energy level in the disrupted signal element is above the earlier associated baseline, which could indicate that there is a physical object near or in front of the transmitting antenna that may be disturbing to the propagation path of the transmitted signal.

In step 607, the DRFC platform may estimate an energy level received by the obstruction based on the sensed signal, the transmitted signal, or a combination thereof, wherein the cessation of the transmitted signal, the attenuation of the transmitted signal, the presentation of the alert notification, or combination thereof is based on the energy level. In one embodiment, the energy level of a disrupted signal element received at a sensing antenna may be compared to the energy level of a transmitted signal, wherein a difference between the disrupted signal element and transmitted signals may indicate the amount of energy that was absorbed by an object obstructing the propagation path of the transmitted signal. In various scenarios, objects of different densities and at different distances from the transmitting antenna may absorb different amounts of energy level from the transmitting signal. For example, a stack of boxes of paper placed at a location in the propagation path of a transmitted signal will absorb a different amount of energy from the transmitted signal when compared to a human body located at the same location. In one embodiment, the DRFC platform may utilize the information of the energy level received/absorbed by the obstructing object and determine for initiate one or more actions accordingly. For example, if it is determined that a human being is the obstructing object, then immediate actions may be initiated to attenuate, stop, or modify transmission of the signal. Additionally, depending on the obstructing object, one or more notification alerts may be presented via the available UI elements. For example, if it is determined that a human being is the obstructing object, then the notification alerts may include visual or audio signals for warning the human being near the transmitting signal. In one example, if the obstructing object is determined to be nonhuman, then one or more other nearby sensors (e.g., a camera) may be utilized to determine what the object is and what actions to initiate (e.g., notify a nearby service attendant).

In step 609, the DRFC platform may compare the energy level to an exposure threshold to initiate the cessation of the transmitted signal, the attenuation of the transmitted signal, the presentation of the alert notification, or combination thereof. In one embodiment, the energy level received/absorbed by an object obstructing the propagation of a single may be compared to a threshold value (e.g., statutory, industry use, etc.), wherein if the energy level meets the threshold then the DRFC platform initiate one or more actions for stopping, attenuating, or modifying the transmission of the signal. Additionally, one or more alert notifications may be presented via the UI elements near the transmitted signal.

FIG. 7 illustrates a report 700 including event and alert information associated with one or more points in a communication system. In one example, the report 700 may be associated with a "Service Provider X—Transmission Signal Report" including identifiers 701 and events 703. In one scenario, the identifiers 701 may indicate a location of a transmission hub, an associated signal type, a target of the signal, and active alerts. For example, alert is associated with a signal of a transmission hub located at "Plaza Building" where the signal is for providing a communication link between the "Plaza Building" and "Golden Tower", which may be another building or a communication antenna tower located at some distance from the "Plaza Building." Further, the report may include information about an event that caused an alert at the transmission hub location "Plaza Building." In one embodiment, a recipient (e.g., a service provider) of the report 700 may initiate an action to address the event or the alert. For example, to stop, restart, or modify the transmission signal affected with the event.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The exemplary techniques and systems presented herein enable implementation of a DRFC platform mechanism to detect obstacles near a wireless communication system and dynamically control one or more functions in the system. As an advantage, a DRFC platform may be utilized to detect obstacles near a wireless signal source and dynamically control one or more parameters associated with the signal.

The processes described herein for facilitating a DRFC platform may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
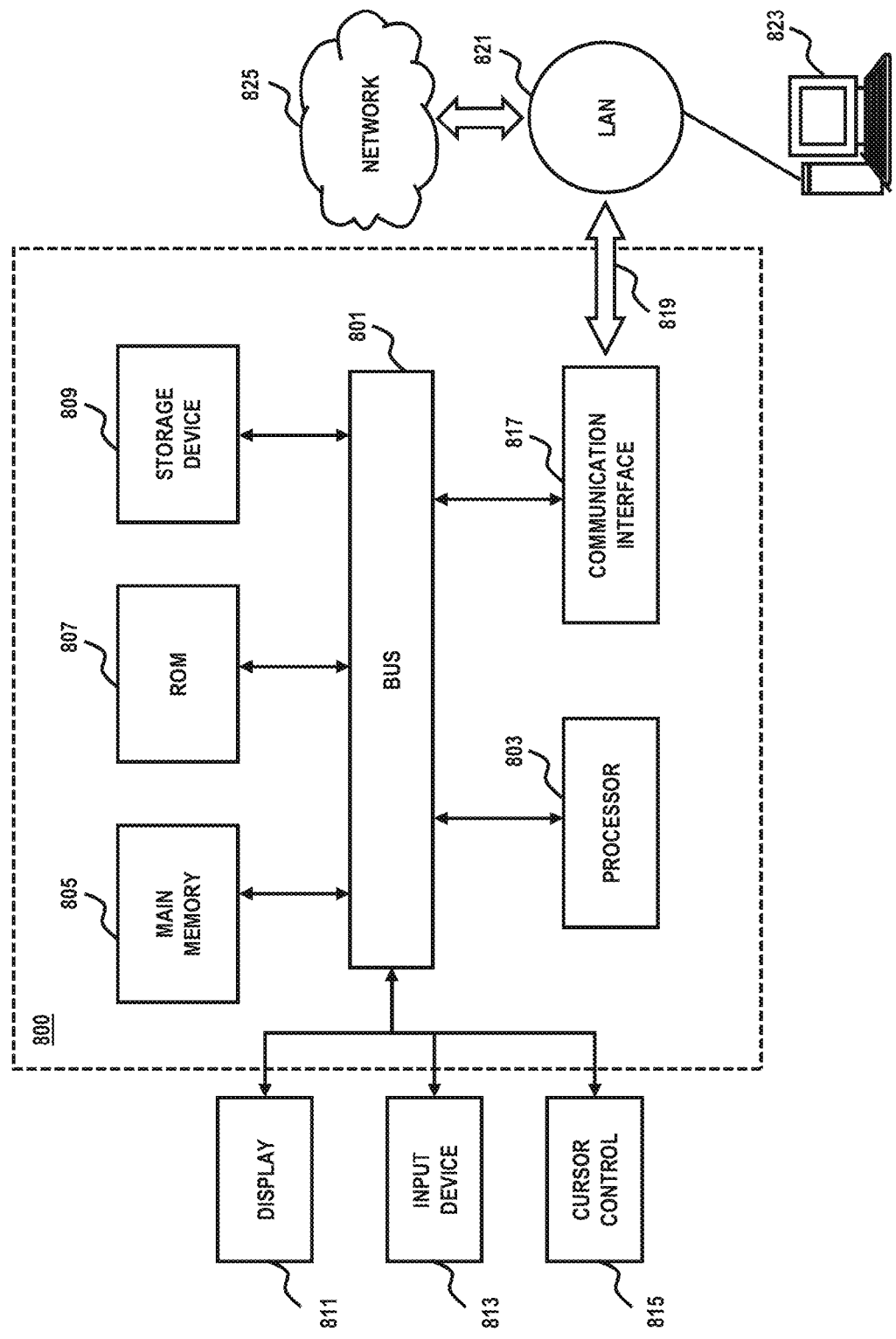
FIG. 8 is a diagram of a computer system that can be used to implement various exemplary embodiments.

FIG. 8 illustrates computing hardware (e.g., computer system) upon which an embodiment according to the invention can be implemented. The computer system 800 includes a bus 801 or other communication mechanism for communicating information and a processor 803 coupled to the bus 801 for processing information. The computer system 800 also includes main memory 805, such as random access memory (RAM) or other dynamic storage device, coupled to the bus 801 for storing information and instructions to be executed by the processor 803. Main memory 805 also can be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multiprocessing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 9:
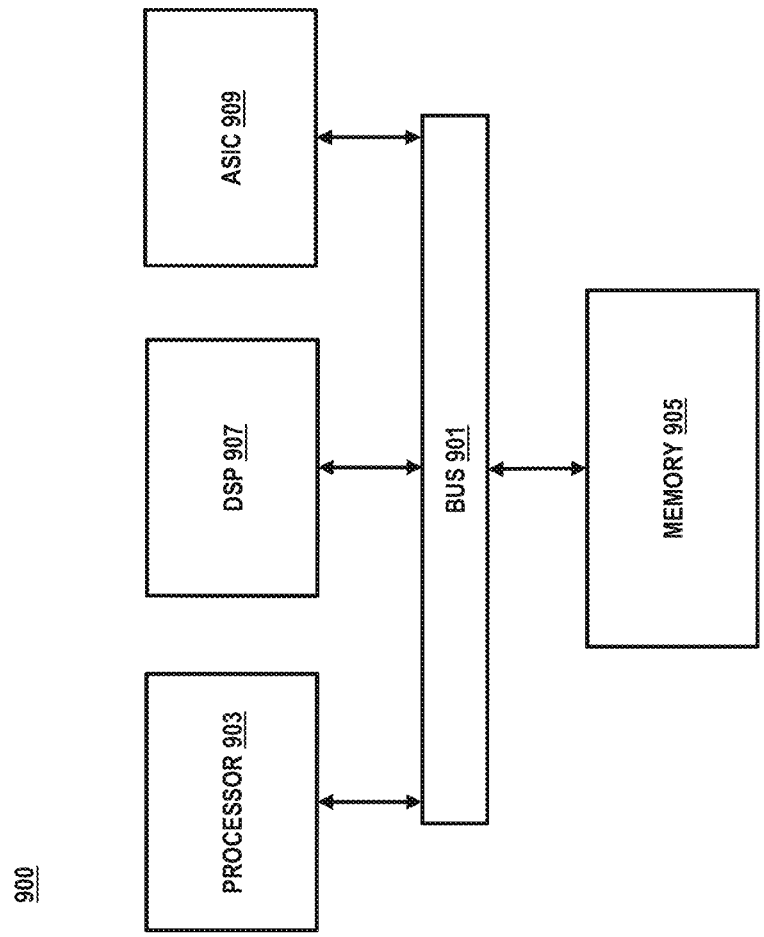
FIG. 9 is a diagram of a chip set that can be used to implement an embodiment of the invention.

FIG. 9 illustrates a chip set 900 upon which an embodiment of the invention may be implemented. Chip set 900 is programmed to provide for detecting obstacles near a wireless signal source and dynamically control one or more parameters associated with the signal, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of FIGS. 4 through 6.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    transmitting, by a transmit antenna of a transmission hub in a wireless communication system, a signal that includes data destined for one or more target antennas;
    receiving, at a sensing antenna of the transmission hub, a version of the transmitted signal, as a sensed signal, wherein the sensing antenna is different than the one or more target antennas;
    determining that the sensed signal is a disrupted signal element of the transmitted signal, the determination being based on an analysis of the sensed signal and the transmitted signal to determine whether a human body, in a propagation path of the transmitted signal, caused the disruption; and
    initiating a cessation of the transmitted signal, an attenuation of the transmitted signal, a presentation of an alert notification, or combination thereof based on the determination that the human body caused the disruption in the sensed signal.

2. A method of claim 1, further comprising:
    processing the transmitted signal to determine a transmitted signal profile;
    processing the sensed signal to determine a sensed signal profile; and
    determining a match of the transmitted signal profile and the sensed signal profile,
    wherein the cessation of the transmitted signal, the attenuation of the transmitted signal, the presentation of the alert notification, or combination thereof is based on the match.

3. A method of claim 1, further comprising:
    determining that the sensed signal is an increase from a baseline level,
    wherein the cessation of the transmitted signal, the attenuation of the transmitted signal, the presentation of the alert notification, or combination thereof is based on the increase.

4. A method of claim 3, wherein the baseline level is a moving average of the sensed signal.

5. A method of claim 1, further comprising:
    determining at least one characteristic of the transmitted signal; and
    configuring the sensing antenna to monitor the sensed signal based on the at least one characteristic.

6. A method of claim 5, wherein the at least one characteristic is determined from a coaxial tap of the transmitting antenna.

7. A method of claim 1, further comprising:
    determining that an obstruction of the transmitted signal is a cause of the disrupted signal element; and
    estimating an energy level received by the obstruction based on the sensed signal, the transmitted signal, or a combination thereof,
    wherein the cessation of the transmitted signal, the attenuation of the transmitted signal, the presentation of the alert notification, or combination thereof is based on the energy level.

8. A method of claim 7, further comprising:
    comparing the energy level to an exposure threshold to initiate the cessation of the transmitted signal, the attenuation of the transmitted signal, the presentation of the alert notification, or combination thereof.

9. An apparatus comprising a processor configured to:
    transmit, by a transmit antenna of a transmission hub in a wireless communication system, a signal that includes data destined for one or more target antennas;
    receive a sensed signal at a sensing antenna of the transmission hub, wherein the sensed signal includes a modified version of the transmitted signal, and wherein the sensing antenna is different than the one or more target antennas;
    determine that the sensed signal is a disrupted signal element of the transmitted signal, the determination being based on an analysis of the sensed signal to determine whether a human body, in a propagation path of the transmitted signal, caused the disruption; and
    initiate a cessation of the transmitted signal, an attenuation of the transmitted signal, a presentation of an alert notification, or combination thereof based on the determination that the human body caused the disruption in the sensed signal.

10. An apparatus of claim 9, wherein the apparatus is further caused to:
    process the transmitted signal to determine a transmitted signal profile;
    process the sensed signal to determine a sensed signal profile; and
    determine a match of the transmitted signal profile and the sensed signal profile,
    wherein the cessation of the transmitted signal, the attenuation of the transmitted signal, the presentation of the alert notification, or combination thereof is based on the match.

11. An apparatus of claim 9, wherein the apparatus is further caused to:
    determine that the sensed signal is an increase from a baseline level,
    wherein the cessation of the transmitted signal, the attenuation of the transmitted signal, the presentation of the alert notification, or combination thereof is based on the increase.

12. An apparatus of claim 11, wherein the baseline level is a moving average of the sensed signal.

13. An apparatus of claim 9, wherein the apparatus is further caused to:
    determine at least one characteristic of the transmitted signal; and
    configure the sensing antenna to monitor the sensed signal based on the at least one characteristic.

14. An apparatus of claim 13, wherein the at least one characteristic is determined from a coaxial tap of the transmitting antenna.

15. An apparatus of claim 9, wherein the apparatus is further caused to:
   determine that an obstruction of the transmitted signal is a cause of the disrupted signal element; and
   estimate an energy level received by the obstruction based on the sensed signal, the transmitted signal, or a combination thereof,
   wherein the cessation of the transmitted signal, the attenuation of the transmitted signal, the presentation of the alert notification, or combination thereof is based on the energy level.

16. An apparatus of claim 15, wherein the apparatus is further caused to:
   compare the energy level to an exposure threshold to initiate the cessation of the transmitted signal, the attenuation of the transmitted signal, the presentation of the alert notification, or combination thereof.

17. A system comprising:
   a transmit antenna to transmit a signal that includes data destined for one or more target antennas;
   a sensing antenna associated with the transmit antenna, the sensing antenna being different than the one or more target antennas; and
   a platform configured to:
      receive a sensed signal at the sensing antenna, wherein the sensed signal includes a modified version of the signal originating from the transmit antenna;
      determine that the sensed signal is a disrupted signal element of the transmitted signal, the determination being based on an analysis of the sensed signal to determine whether a human body, in a propagation path of the transmitted signal, caused the disruption; and
      initiate a cessation of the transmitted signal, an attenuation of the transmitted signal, a presentation of an alert notification, or combination thereof based on the determination that the human body caused the disruption in the sensed signal.

18. A system of claim 17, wherein the platform is further configured to:
   process the signal originating from the transmit antenna to determine a transmitted signal profile;
   process the sensed signal to determine a sensed signal profile; and
   determine a match of the transmitted signal profile and the sensed signal profile,
   wherein the cessation of the transmitted signal, the attenuation of the transmitted signal, the presentation of the alert notification, or combination thereof is based on the match.

19. A system of claim 17, wherein the platform is further configured to:
   determine that the sensed signal is an increase from a baseline level,
   wherein the cessation of the transmitted signal, the attenuation of the transmitted signal, the presentation of the alert notification, or combination thereof is based on the increase.

20. A system of claim 17, wherein the controller platform is further configured to:
   determine that an obstruction of the signal originating from the transmit antenna is a cause of the disrupted signal element; and
   estimate an energy level received by the obstruction based on the sensed signal, the transmitted signal, or a combination thereof,
   wherein the cessation of the transmitted signal, the attenuation of the transmitted signal, the presentation of the alert notification, or combination thereof is based on the energy level.

* * * * *